(12) United States Patent
San Martin et al.

(10) Patent No.: US 10,386,525 B2
(45) Date of Patent: Aug. 20, 2019

(54) UNIAXIAL ANISOTROPY DETECTION APPARATUS, SYSTEMS, AND METHODS

(71) Applicant: Halliburton Energy Services, Inc., Houston, TX (US)

(72) Inventors: Luis Emilio San Martin, Houston, TX (US); Baris Guner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 111 days.

(21) Appl. No.: 15/533,623

(22) PCT Filed: Mar. 31, 2015

(86) PCT No.: PCT/US2015/023578
§ 371 (c)(1),
(2) Date: Jun. 6, 2017

(87) PCT Pub. No.: WO2016/159976
PCT Pub. Date: Oct. 6, 2016

(65) Prior Publication Data
US 2018/0267194 A1      Sep. 20, 2018

(51) Int. Cl.
*G01V 3/00*      (2006.01)
*G01V 3/20*      (2006.01)
(Continued)

(52) U.S. Cl.
CPC ............ *G01V 3/20* (2013.01); *E21B 47/0002* (2013.01); *E21B 47/024* (2013.01); *E21B 49/00* (2013.01);
(Continued)

(58) Field of Classification Search
CPC ... G01V 3/28; G01V 3/38; G01V 3/18; G01V 3/20; G01V 3/22; G01V 3/24; G01V 3/26;
(Continued)

(56) References Cited

U.S. PATENT DOCUMENTS 6,046,593 A * 4/2000 Eisenmann ............... G01V 3/20
324/373
6,191,588 B1 * 2/2001 Chen ........................ G01V 3/20
324/367
(Continued)

OTHER PUBLICATIONS

"International Application Serial No. PCT/US2015/023578, International Search Report dated Dec. 23, 2015", 3 pgs.
(Continued)

*Primary Examiner* — Thang X Le
(74) *Attorney, Agent, or Firm* — Gilliam IP PLLC (57) ABSTRACT

Disclosed embodiments include various borehole imaging tools and methods to provide sensing surface configurations for improving the assessment of anisotropy in layered formations. In at least some embodiments, the borehole imaging tools employ a unitary conductive body to provide a wall-contacting face with grooves that define multiple elongated sensing surfaces. This wall-contacting face can be provided on an extendable sensor pad of a wireline logging tool or embedded on the outer surface of a LWD stabilizer fin. Toroids may be seated in the grooves around each elongated sensing surface for measuring the current flow through each sensing surface. The elongated sensing surfaces can be arranged in pairs as a series of rectangular-shaped grooves that are aligned perpendicularly to each other within each of the pairs to improve detection of anisotropy in thin layered formations and improve the sensitivity to dipping in anisotropic formations.

22 Claims, 8 Drawing Sheets

(51) Int. Cl.
*E21B 47/00* (2012.01)
*E21B 47/024* (2006.01)
*E21B 49/00* (2006.01)
*E21B 17/10* (2006.01)
*E21B 17/16* (2006.01)
*E21B 47/18* (2012.01)

(52) U.S. Cl.
CPC ........... *E21B 17/1078* (2013.01); *E21B 17/16* (2013.01); *E21B 47/18* (2013.01)

(58) Field of Classification Search
CPC ............ G01V 3/30; G01V 3/10; G01V 3/265; G01V 3/02; G01V 3/04; G01V 3/06; G01V 3/104; G01N 27/223; G01N 33/246; G01R 27/18; G01R 27/20; G01R 31/2621; G01R 31/2623; G01R 31/275; G01R 31/2884; G01R 31/2608; G01R 31/2614; G01R 31/2607; G01R 31/31924; G01R 31/3004; G01R 31/31922; G01R 31/318511; G01R 31/2831; G01R 31/318505
See application file for complete search history.

(56) References Cited

U.S. PATENT DOCUMENTS

| | | | |
|---|---|---|---|
| 9,158,025 B2 * | 10/2015 | Forgang | G01V 3/20 |
| 2004/0113626 A1 * | 6/2004 | Wang | G01V 3/28 324/339 |
| 2007/0046291 A1 | 3/2007 | Itskovich | |
| 2008/0278171 A1 * | 11/2008 | Itskovich | G01V 3/24 324/355 |
| 2008/0315884 A1 * | 12/2008 | Bittar | G01V 3/24 324/366 |
| 2009/0271115 A1 | 10/2009 | Davis et al. | |
| 2012/0059616 A1 * | 3/2012 | Zhao | G01V 3/20 702/85 |
| 2017/0145806 A1 * | 5/2017 | San Martin | G01V 3/20 |

OTHER PUBLICATIONS

"International Application Serial No. PCT/US2015/023578, Written Opinion dated Dec. 23, 2015", 12 pgs.

* cited by examiner

UNIAXIAL ANISOTROPY DETECTION APPARATUS, SYSTEMS, AND METHODS

BACKGROUND

The present disclosure relates generally to systems and methods for well logging. In particular, the present invention is an apparatus and method for the imaging of subsurface formations.

Modern oil field operations use information related to the parameters and conditions encountered downhole to aid in drilling decisions. For example, measurements may be made using tools located within a borehole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a sonde is lowered into the borehole after a portion of a well has been drilled. The sonde hangs at the end of a wireline cable that provides mechanical support to the sonde and also provides an electrical connection between the sonde and electrical equipment located at the surface of the well. In LWD, the drilling assembly includes sensing instruments that measure various parameters as the formation is being penetrated.

Among the available wireline and LWD tools for evaluating geological formations are various resistivity logging tools including, galvanic or laterolog tools. Such tools can use electrodes to inject electrical currents into surrounding earth formation for taking resistivity measurements. An apparent resistivity (or conductivity) of a formation may be evaluated such as by injecting the electrical currents from a location within the borehole into a portion of the formation, and conductively measuring a resulting voltage induced by the current. Such resistivity information may provide a general indication of formation composition or geometry, including providing indicia of invasion or hydrocarbon presence.

For example, it is often desirable to construct an image of the borehole wall. Among other things, such images reveal the fine-scale structure of the penetrated formations. The structure includes stratifications such as shale/sand sequences, fractures, and non-homogeneities caused by irregular cementation and variations in pore size. Orientations of fractures and strata can also be identified.

DETAILED DESCRIPTION

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

Various techniques may be used to evaluate geological formations. For example, measurements can be made using tools located within a borehole. Examples of tools include borehole resistivity measurement tools (i.e., "galvanic tools") and tools including one or more guard electrodes configured to provide an equal potential region in a medium nearby an electrode array, thus forcing a larger proportion of the injected current into the formation. Such a configuration is generally referred to as a "laterolog" or "guard log" tool. Further development of laterolog tools included providing an array of current and monitor electrodes, such as to provide resistivity logging for a variety of relatively shallower or relatively deeper radial depths of investigation. In an array laterolog, focusing of an injected current may be established using hardware or software techniques, or a combination of both hardware and software techniques.

The geological formations surrounding the borehole may comprise sequences of layers with different physical properties. These formation layers may be modeled as a uniaxial anisotropic medium with parameters $R_h$ and $R_v$, where $R_h$ is the resistivity within the plane of the layers and $R_v$ is the resistivity perpendicular to the layers. Within each layer, the variation of physical properties is usually relatively minor. The properties between the different layers, however, can be drastically different. For example, the layered formations are often characterized in having anisotropy in resistivity, wherein resistivity perpendicular to the layers can be much higher than the resistivity on the plane of the layers.

The uniaxial anisotropy of the layers in the geologic formations may be measured to assist in the identification of hydrocarbon reservoirs. However, galvanic and laterolog tools often have very little sensitivity to the vertical resistivity. In some cases, the thickness of formation layers are thinner than the resolution of a laterolog tool (e.g., 2-4 inches). For example, in the absence of a borehole, a laterolog that measures the resistivity of a medium has no sensitivity to vertical resistivity. In the presence of a borehole, only a small sensitivity to the vertical resistivity is present in the laterolog. Only when the formation layers are dipping with respect to the borehole does the array laterolog become more sensitive to anisotropy. The sensitivity of the laterolog in medium to high dip angles is present due to focused currents from the laterolog that cross both the high and low sensitivity layers (but the laterolog has a stronger sensitivity to the vertical resistivity $R_v$), with the sensitivity of the laterolog to anisotropy varying between $R_h$ and $\sqrt{R_v R_h}$. That is, even at 90 degrees, the sensitivity of the laterolog is only $R=\sqrt{R_v R_h}$. The sensitivity to anisotropy in dipping cases is not higher due to the axial symmetry of the laterolog. Even when the dip angle is 90 degrees and currents go across layers, some do not cross boundaries at all. It is clear that for any dip angle, there are currents that do not cross boundaries and the effect of these two cases and others in between are all mixed in the operation of the symmetric laterolog tool.

This disclosure describes systems and methods for using various borehole imaging tools and methods having electrode configurations suitable for obtaining information indicative of a formation resistivity, such as using a galvanic tool, even under low dip conditions. In at least some embodiments, disclosed embodiments describe borehole imaging tools including a conductive body having a wall-contacting face with grooves that define multiple elongated sensing surfaces. The elongated sensing surfaces are each defined by one or more grooves in the wall-contacting face the borehole imaging tool, with each elongated sensing surface having a corresponding toroid seated in the one or more grooves defining that elongated sensing surface.

The wall-contacting face can be provided on an extendable sensor pad of a wireline logging tool or embedded on the outer surface of a LWD stabilizer fin. For wireline logging, the tool is part of a sonde that is lowered to the bottom of the region of interest and the elongated sensing surfaces are deployed to contact the wall and perform logging as the logging tool is pulled uphole at a steady rate. For LWD, the tool may be disposed on the drill string, e.g. as part of the bottom hole assembly, and is used to perform logging while drilling. LWD tools may generally employ larger elongated sensing surfaces than wireline logging tools to provide better standoff tolerance.

The tool further includes at least one processing unit that obtains measurements of each toroid's response when a voltage or current is applied between the conductive body and a return electrode, and that derives a formation impedance measurement for each elongated sensing surface based at least in part on said toroid responses. The imaging tool can further include one or more tracking instruments that track a position and orientation of the wall-contacting face, to enable the at least one processing unit to aggregate the formation impedance measurements as a function of position to obtain a borehole wall resistivity image.

Figure 1:
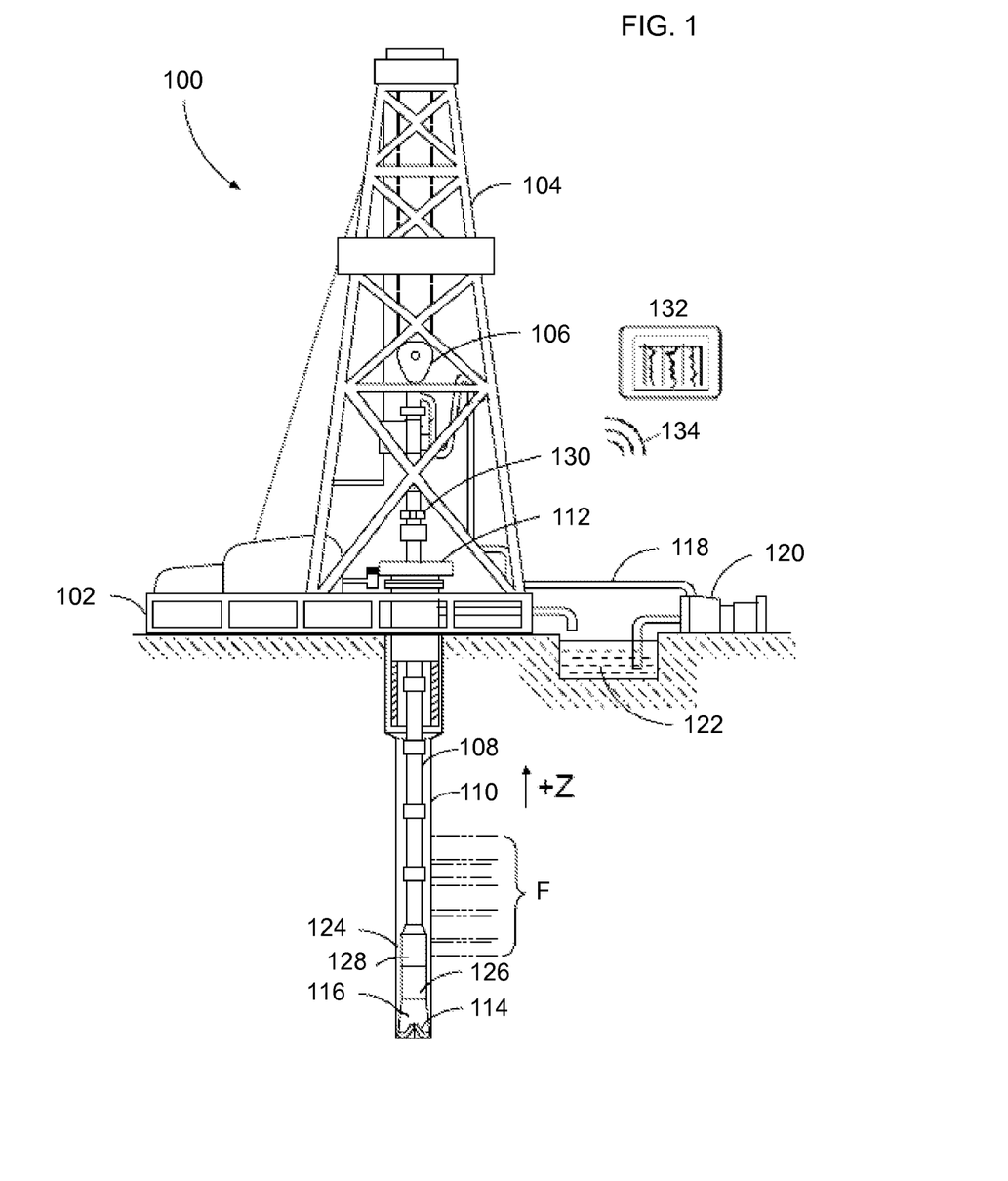
FIG. 1 shows an illustrative logging while drilling (LWD) environment.

The disclosed tools and methods are best understood in the context of the larger systems in which they operate. Accordingly, FIG. 1 illustrates an example logging while drilling (LWD) or measuring while drilling system 100. A drilling rig or platform 102 supports a derrick 104 or other supporting structure, such as including or coupled to a hoist 106. The hoist 106 is used for raising or lowering equipment or other apparatus such as drill string 108. The drill string 108 accesses a borehole 110, also known as a wellbore, such as through a wellhead 112. The borehole 110 may be drilled in any direction, for example, vertical, inclined, horizontal, and combinations thereof. The lower end of the drill string 108 includes various apparatus, such as a drill head 114, to provide the borehole 110. A downhole motor assembly 116 rotates the drill head 114. As the drill head 114 rotates, it extends the borehole 110 that passes through various subsurface formations F. The downhole motor assembly 116 may include a rotary steerable system (RSS) that enables the drilling crew to steer the borehole 110 along a desired path.

Drilling fluid or "mud" circulates in the annular region around the drill head 114 or elsewhere, such as provided to the borehole 110 through a supply pipe 118, circulated by a pump 120, and returning to the surface to be captured in a retention pit 122 or sump. The drilling fluid transports cuttings from the borehole into the retention pit 122 and aids in maintaining the borehole integrity.

The drill head 114 and downhole motor assembly 116 form a portion of a bottom hole assembly (BHA) 124 that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation or azimuth), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

Various subs or tool assemblies may also be located along the drill string 108 and/or in the BHA 124. As the BHA 124 passes through various regions of the formation F, information may be obtained. For example, the BHA 124 may include a borehole imaging tool 126 that collects measurements relating to various formation properties as well as the tool orientation and/or other drilling conditions. In one embodiment, the borehole imaging tool 126 is provided with a plurality of sensing pads that may be pressed against the wall of the borehole 110 to obtain measurements. As the drill head 114 extends the borehole 110 through the subsurface formations F, the borehole imaging tool 126 collects measurements for use in determining an apparent formation F resistivity. Micro-resistivity measurements (or complex impedance measurements) that a downhole controller associates with tool position and orientation measurements is used to map (e.g., form an image of) the borehole wall. The measurements can be stored in internal memory of the borehole imaging tool and/or be communicated to the surface.

A telemetry sub 128 is included in the bottomhole assembly 124 to provide a communications link with the surface. The telemetry sub 128 includes wireless telemetry or logging capabilities, or both, such as to transmit or later provide information indicative of a formation resistivity to operators on the surface or for later access in evaluation of formation F properties. Mud pulse telemetry is one common telemetry technique for transferring tool measurements to a surface interface 130 and to receive commands from the surface interface 130, but other telemetry techniques can also be used. For example, the surface interface 130 includes one or more of wireless telemetry, processor circuitry, or memory facilities, such as to support log-while-drilling (LWD) or measurement-while-drilling (MWD) operations.

A surface processor, shown in FIG. 1 in the form of a tablet computer 132, communicates with surface interface 130 via a wired or wireless network communications link 134, and provides a graphical user interface (GUI) or other form of interface that enables a user to provide commands and to receive and optionally interact with a visual representation of the acquired measurements. The surface processor can take alternative forms, including a desktop computer, a laptop computer, an embedded processor, a cloud computer, a central processing center accessible via the internet, and any combination of the foregoing.

Figure 2:
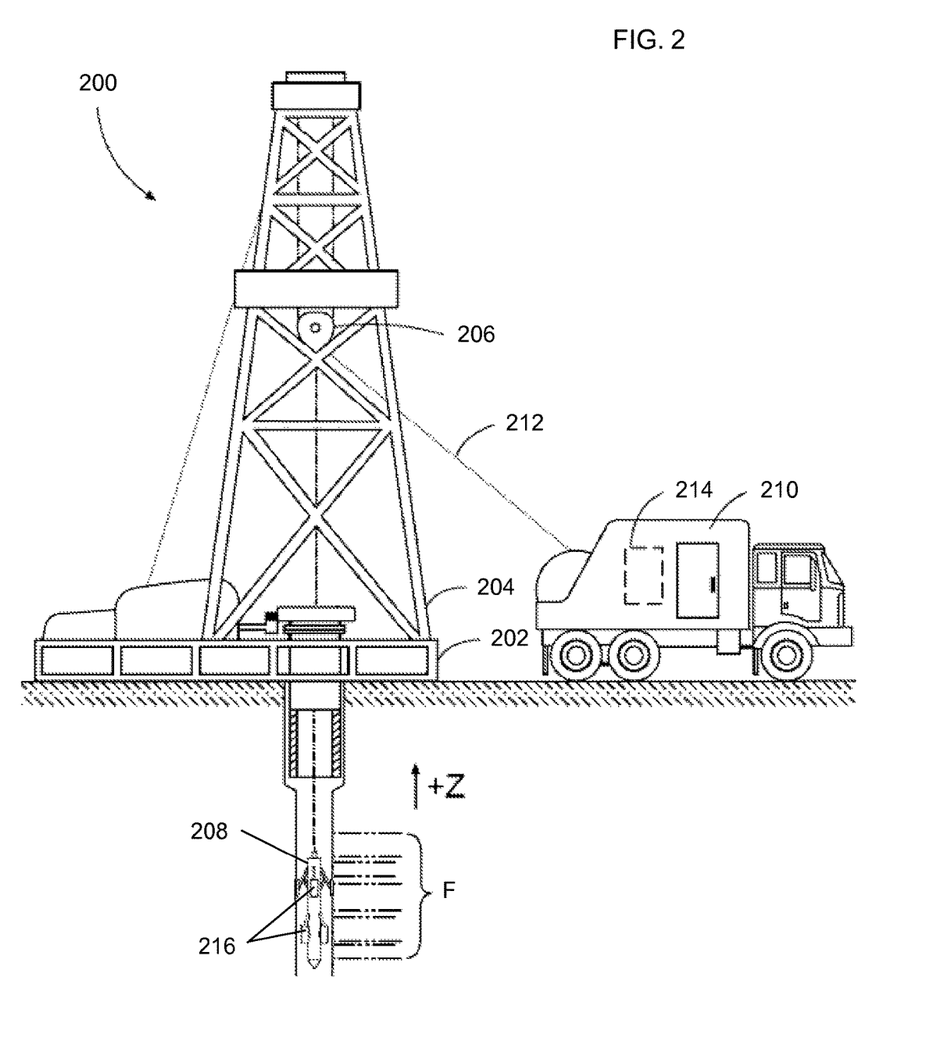
FIG. 2 shows an illustrative wireline logging environment.

At various times during the drilling process, the drill string 108 may be removed from the borehole, allowing wireline logging operations to be conducted in a wireline logging system 200 as shown in FIG. 2. A platform 202, such as coupled to a derrick 204, includes a hoist 206 that is used to raise or lower equipment such as a wireline logging tool 208, such as a wireline sonde, into or out of a borehole. In this wireline example, a logging facility 210 (e.g., logging truck) suspends the wireline logging tool 208 on a wireline cable 212 providing a communicative coupling between the wireline logging tool 208 and the logging facility 210.

Measurements from the formation F may be obtained, such as using a galvanic tool included as at least a portion of the wireline logging tool 208. The galvanic tool may comprise, for example, an array laterolog. The measurements include resistivity measurements of the formation F. The wireline cable 212 includes conductors for transporting power to the tool and telemetry from the tool to the surface, where the logging facility 210 includes a processor 214 (e.g., a computer or other storage or control circuitry) that acquires and stores measurement data from the wireline logging tool 208. The wireline logging tool 208 may have pads and/or centralizing springs to maintain the tool near the axis of the borehole as the tool traverses the borehole. In one embodiment, the wireline logging tool 208 includes a borehole imaging portion having sensing pads 216 which are mounted on devices that press the sensing pads 216 against the borehole wall.

The borehole imaging tool 126 or the wireline logging tool 208 collects formation impedance measurements (e.g., resistivity, conductivity, reactance, or complex impedance) that are associated with distance Z along the borehole and azimuthal angle θ around the borehole to provide a borehole wall image. The surface of the borehole wall may be divided into "bins", with each bin representing a pair of position Z and azimuthal angle θ values. Each time the sensing surface passes a bin, it gathers one or more measurements that can be combined with previous measurements for that bin. The combined measurements can then be processed to obtain an impedance estimate that can be displayed as a pixel color and/or a pixel intensity. Such an image often reveals bedding structures and fractures, which often exhibit a sinusoidal dependence on azimuthal angles. Such dependence indicates that the (circular) borehole encountered the (planar) feature at an angle other than 90 degrees. We note here that such features are usually apparent even if the impedance measurements are only relative in nature rather than quantitatively accurate.

The image resolution is limited by a number of factors, including electrode size, electrode spacing, signal frequency, borehole fluid conductivity (relative to the formation), and the standoff between the borehole wall and the elongated sensing surface. The standoff is of course a function of tool and borehole geometry, but also to some extent a function of mudcake thickness and any fluid flow layers created by motion of the tool. The use of multiple signal frequencies maximizes the range of environment in which adequate tool performance can be achieved, leaving electrode size and spacing as the major design parameters for the tool designer to optimize.

For purposes of illustration, the examples of FIGS. 1 and 2 show a vertically-oriented borehole configuration. However, the apparatus and techniques described herein may also be used in other borehole configurations, such as a borehole including a horizontal penetration direction, or an oblique borehole configuration, for example. The examples of FIGS. 1 and 2 also generally illustrate land-based examples. Alternatively, the apparatus and techniques described herein may be used in offshore environments as well, such as for subsea operations. In particular, offshore or subsea operations may include use of wireline or LWD/MWD apparatus and techniques including aspects of the examples herein.

Figure 3:
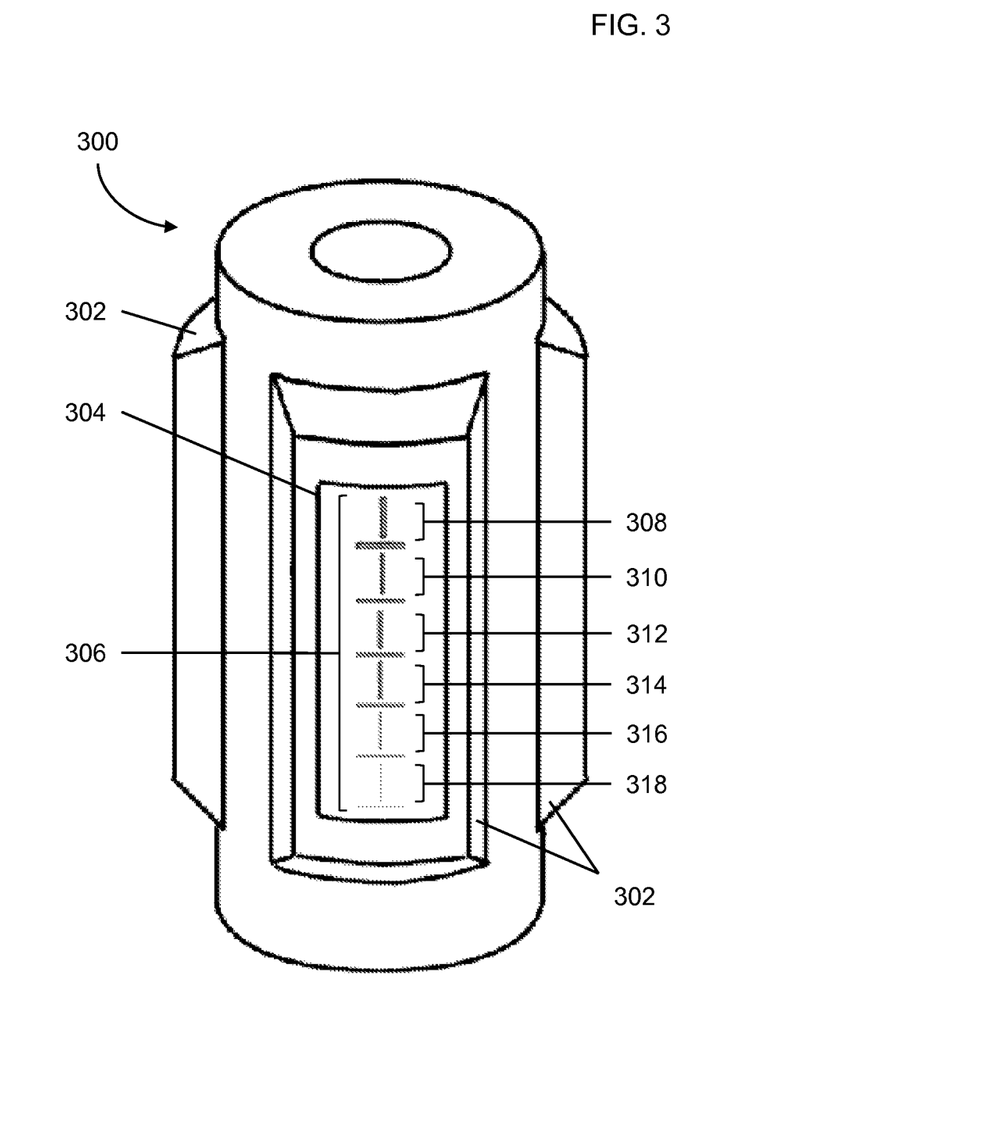
FIG. 3 illustrates a perspective view of a LWD borehole imaging tool with an example tool pad configuration.

FIG. 3 shows a perspective view of one portion of an exemplary LWD borehole imaging tool 300. The borehole imaging tool 300 is a drill collar (e.g., a thick-walled steel tubular) having two or more stabilizer fins 302 that maintain the borehole imaging tool 300 near the center of the borehole and, in so doing, minimizes standoff between the external faces of the stabilizer fins 302 and the borehole wall. The borehole imaging tool 300 includes a pad 304 having grooves that define multiple elongated sensing surfaces 306 embedded in the external, wall-contacting face of at least one stabilizer fin 302 of the borehole imaging tool 300. The wall-contacting face may be provided on an extendable sensor pad or embedded on the outer surface of a LWD stabilizer fin. The sensor placement on the external surfaces (e.g., wall-contacting faces) of the stabilizer fin(s) minimizes standoff from the borehole wall and generally yields improved image resolution. Other mechanisms can be employed to minimize standoff, such as pads mounted on extendable arms or biasing springs as shown in FIG. 2. Such arms or springs may be used to force the tool body itself against the borehole wall.

The body of the pad 304 is a conductive material, such as steel or another metal, with a set of grooves cut into the wall-contacting face of the pad 304 that form a closed loop around each individual elongated sensing surface 306. A toroid (not shown) is seated along the closed loop to measure outgoing current flow through each elongated sensing surface. Each toroid includes a closed loop of wire core having a high magnetic permeability (e.g., a molypermalloy powder (MPP)). A wire coil is wound around the closed wire core to generate a voltage in response to changes in the magnetic field along the length of wire core, which in turn indicates the changes in current through the area enclosed by wire core. The coil has leads that are coupled to an amplifier and analog-to-digital converter (ADC). The wire of coil may be a standard fine metal wire that is lacquered or electrically insulated in some fashion, and the leads are twisted and optionally shielded to minimize sensitivity to any stray fields. The twisted leads may also be seated in grooves and routed to a common feed-through aperture for connection to the tool electronics. Alternatively, multiple feed through apertures may be provided to minimize lead lengths. A protective filler material may optionally be placed in the grooves above the toroids to protect and secure the toroids within the grooves. The filler material should be at least somewhat resistive and should preferably be an insulating material such as an epoxy, rubber, ceramic, or plastic (e.g., poly-ether-ether-keytone) material.

In some embodiments, the conductive body of the pad 304 is electrically insulated from the main body of the borehole imaging tool 300 so that the tool body can be employed as a distributed return electrode. The return electrode placement is a matter of design choice. Examples of a distributed return electrode include a conductive tool body (particularly if separated from the elongated sensing surface 306, such as in a wireline tool configuration) and the armor on a wireline cable. In other embodiments, a remote return electrode is used so that the tool body need not be electrically insulated from the conductive body of the pad 304. A remote return electrode can be an electrode placed on a separate stabilizer fin, or on the opposite side of the tool from the elongated sensing surfaces 306, or at some axial distance from the elongated sensing surfaces 306 that is at least equal to the diameter of the tool body and is preferably at least an order of magnitude larger than the characteristic dimension of the elongated sensing surfaces 306.

The elongated sensing surfaces need not be of uniform size, with elongated sensing surfaces that can vary in size and shape. Such arrangements may require more image processing, but may simultaneously provide measurements at multiple depths of investigation and robust imaging performance over a range of operating conditions. For example, FIG. 3 shows the elongated sensing surfaces 306 being arranged in pairs as a series of rectangular-shaped grooves that are aligned perpendicularly to each other within each of the pairs (e.g., 308-318). The term "pair" is used to refer to each set of two perpendicularly aligned grooves having similar dimensions. It is noted that each of the pairs is of a different size relative to the other pairs. For example, the grooves in each of the pairs 308-318 are smaller in size than the pair preceding it, respectively, such that the elongated sensing surfaces 306 are smaller than the surfaces preceding it.

In an example operation of the borehole imaging tool 300, a voltage or current source drives an electrical signal between a return electrode (not shown) and a conductive body of the pad 304, wherein the wall contacting face has a plurality of pairs of grooves (e.g., 308-318) defining multiple elongated sensing surfaces 306. The electrical signal can have multiple frequency components to enable impedance measurements at different frequencies. The range of suitable frequencies varies based on tool configuration, borehole fluid conductivity, and expected formation impedance. For current sources, a measurement of the voltage between the return electrode and the elongated sensing surfaces 306 is measured. To perform logging, an electrical current or voltage signal is applied between the return electrode and the elongated sensing surfaces 306. The current flowing from each elongated sensing surface 306 through the toroids is measured, and based on a ratio between the applied signal and the measured currents, a formation impedance is measured and associated with a position on the borehole wall in front of each elongated sensing surface.

It is noted that the potential over the entire surface of the pad 304 is ideally maintained at a nearly equal potential (or "equipotential") condition. Such an equipotential condition may be established such as by varying excitation current magnitudes so that the equipotential criterion is met (e.g., a "hardware focusing" approach), or by appropriately weighting contributions from excitation currents by processing signals received using the return electrodes (e.g., a "software focusing" approach). For example, such currents may be distinguished such as by using a unique excitation frequency for each excitation current, allowing measurements for multiple modes to be made simultaneously or contemporaneously. It is further noted that in the case of construction of the pad 304 using solid metal, the entire surface is close to an equipotential surface.

Figure 4:
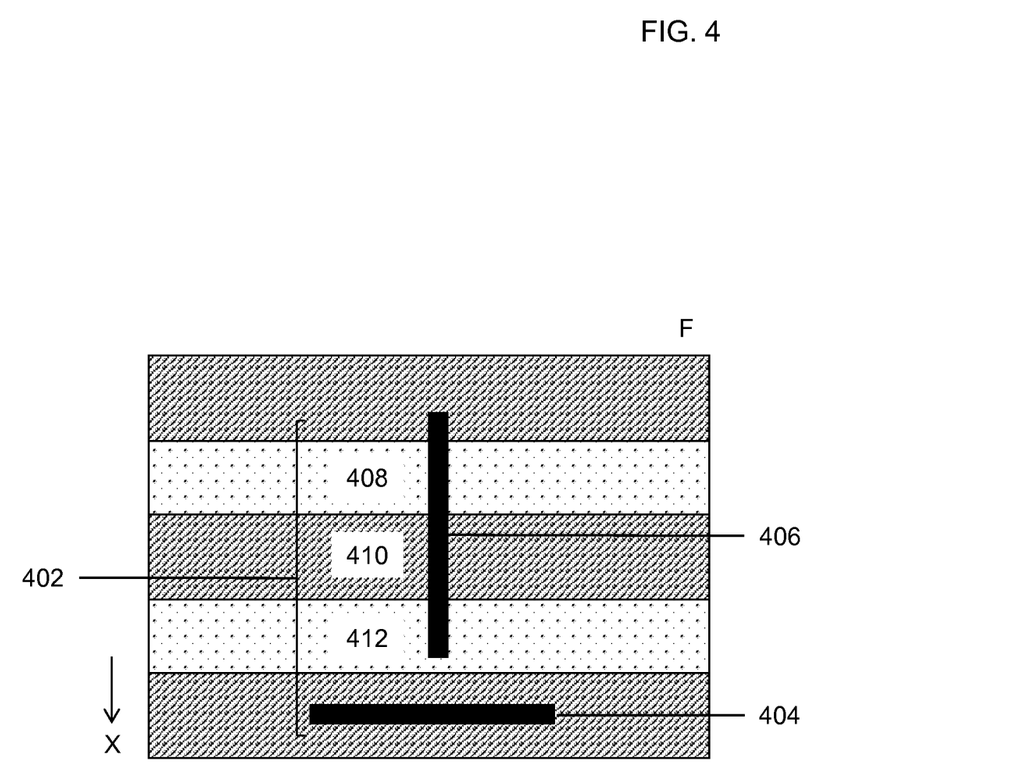
FIG. 4 shows a zoomed-in perspective view of elongated sensing surfaces as they are oriented relative to a downhole formation.

FIG. 4 shows a zoomed-in perspective view of one pair of grooves (e.g., pair 308) as they are oriented relative to a downhole formation F. Because the potential over the entire surface of the pad is approximately constant, the amount of current flowing out of each shape will vary according to its area and the impedance of the formation surface next to it, and the difference the horizontal and the vertical shapes is an indicator of formation anisotropy. The presence of highly conductive mud may present a difficulty because currents could flow through the mud to the low conductivity layers, but here is assumed that focusing prevents such a possibility. In FIG. 4, the difference is due to the presence of thin layers, which for standard resolution tools appear as an equivalent anisotropy. It is in that sense that we describe the situation as anisotropic. The formation anisotropy can be measured by one of the shapes, and for confirmation, the ratio of the currents and the measured width of the layers can also be used to obtain anisotropy. In the example of FIG. 4, the pair of grooves 402 are arranged such that the grooves are positioned perpendicular (e.g., offset by 90 degrees) relative to each other, although layers at other angles or multiple angles could be used (e.g., more than two shapes shown in FIG. 4). As can be seen, for example, in pair 402, groove 404 is perpendicular to groove 406. The resistivity readings of the two perpendicular groves are different. The horizontal groove 404 is able to resolve the layers, and measures a sequence of high and low resistivity values as the tool travels downhole in the direction X. The vertical groove 406 measures the combined resistivity of the layers for which it crosses (e.g., in this example, the vertical shape measures the combined resistivity of the three layers 408, 410, 412).

Figure 5:
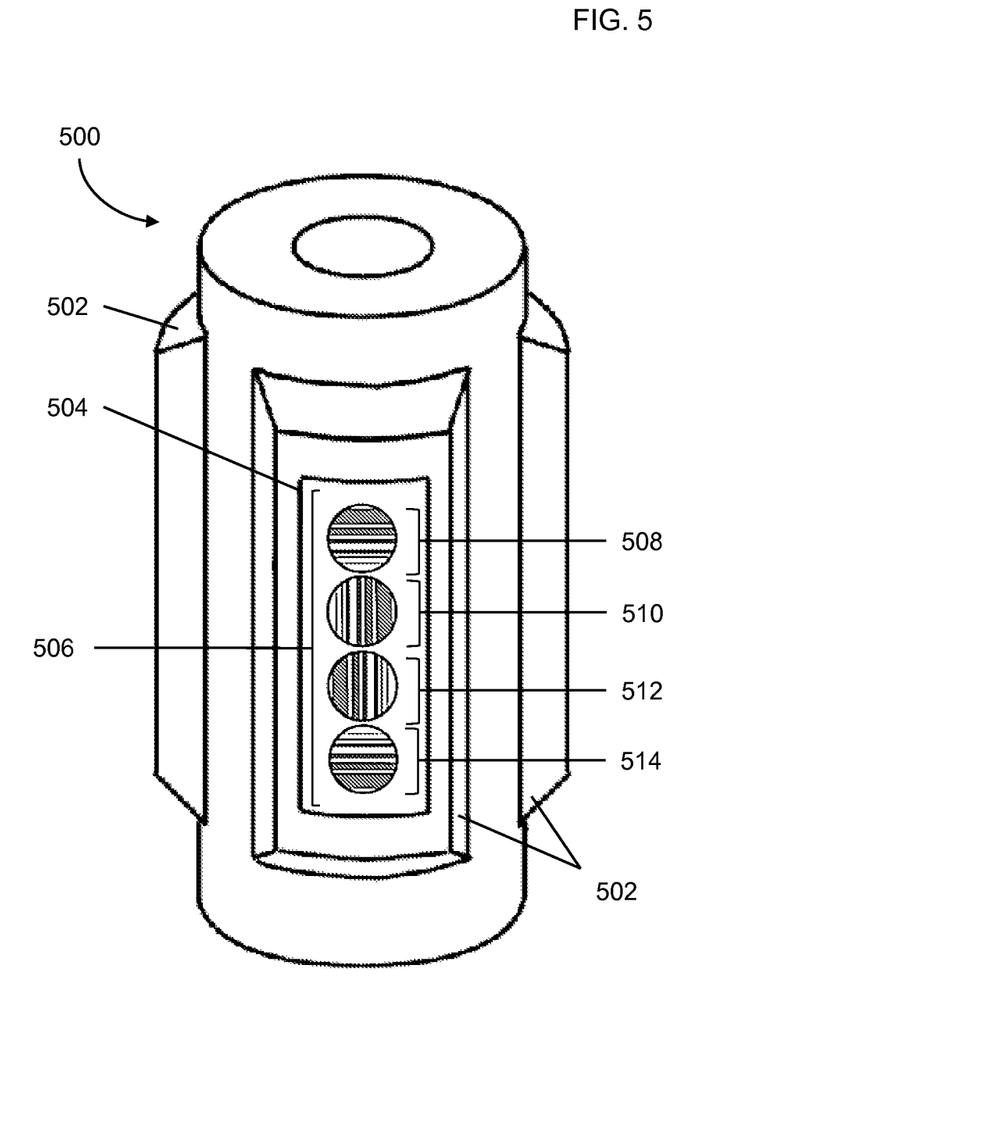
FIG. 5 illustrates a perspective view of a LWD borehole imaging tool with another example tool pad configuration.

Though FIGS. 3-4 shows equally-spaced, uniformly-sized grooves (e.g., within each pair), in some embodiments, different sensing surface configurations including different sizes and/or shapes or angles between them can be used. In an example sensing surface configuration, FIG. 5 shows a perspective view of one portion of another exemplary borehole imaging tool 500. In this example, the borehole imaging tool 500 is a drill collar (e.g., a thick-walled steel tubular) having two or more stabilizer fins 502 that maintain the borehole imaging tool 500 near the center of the borehole and, in so doing, minimizes standoff between the external faces of the stabilizer fins 502 and the borehole wall. The borehole imaging tool 500 includes a pad 504 having grooves that define multiple elongated sensing surfaces 506 embedded in the external, wall-contacting face of at least one stabilizer fin 502 of the borehole imaging tool 500. The wall-contacting face may be provided on an extendable sensor pad or embedded on the outer surface of a LWD stabilizer fin. The sensor placement on the external surfaces (e.g., wall-contacting faces) of the stabilizer fin(s) minimizes standoff from the borehole wall and generally yields improved image resolution. Other mechanisms can be employed to minimize standoff, such as pads mounted on extendable arms or biasing springs as shown in FIG. 2. Such arms or springs may be used to force the tool body itself against the borehole wall. The body of the pad 504 is a conductive material, such as steel or another metal, with a set of grooves cut into the wall-contacting face of the pad 504. The elongated sensing surfaces 506 are positioned within circular shapes (e.g., elements 508-514), with horizontally and vertically oriented grooves defining the elongated sensing surfaces within each circular shape. Toroids are seated along the grooves to measure outgoing current flow through each elongated sensing surface.

In the above embodiments of FIGS. 3-5, the pad is a single piece of metal, allowing the currents to be focused into the formation. In such a case it is convenient to insulate the metal pad back, that faces the borehole, and edges to inject current on the face that touches the wall of the borehole. The metal pad injects current into the formation with current return being parts of the tool, the tool string, or the surface in the case of a wireline tool or to the drill string an isolated part of the drill string or to the surface or some other point, such as a neighboring well casing, etc., in the case of a LWD tool.

Figure 6:
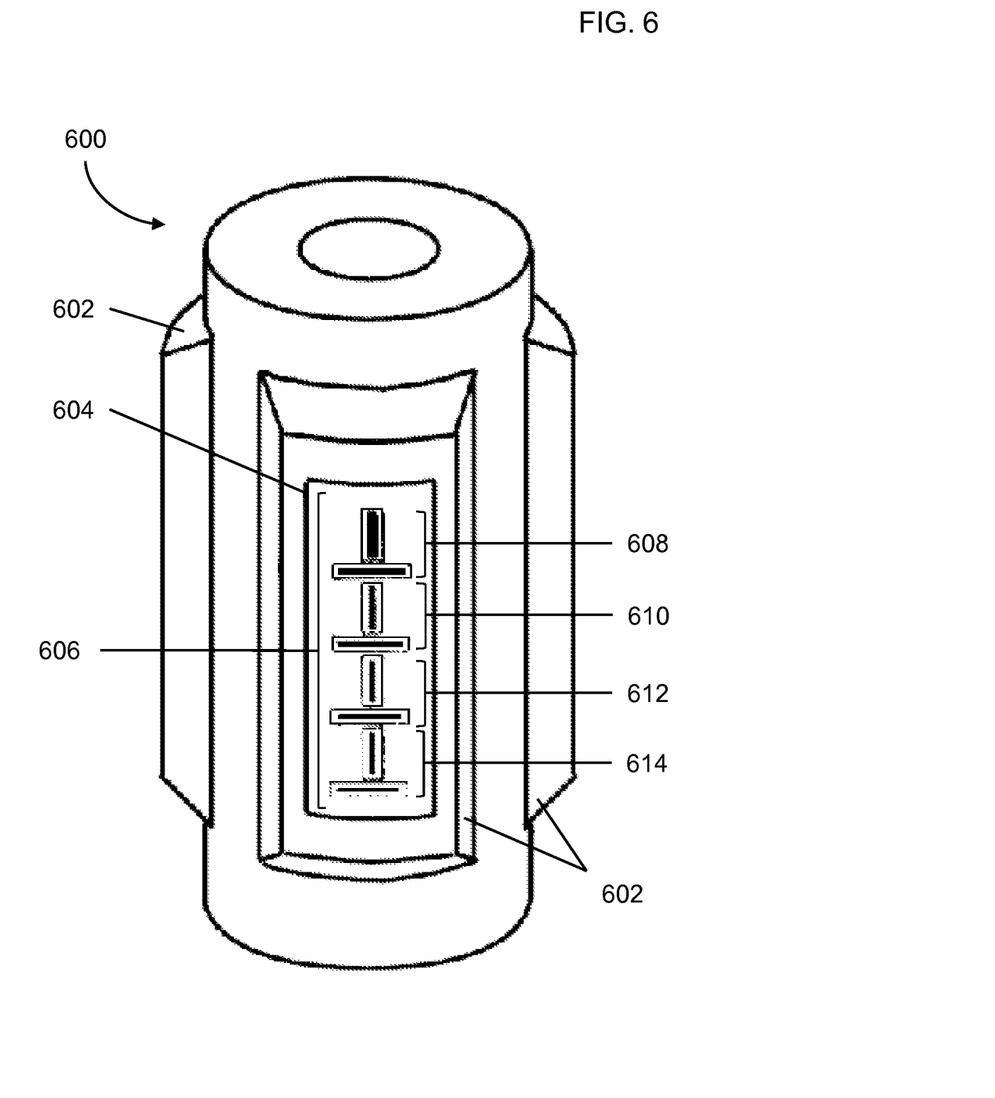
FIG. 6 illustrates a perspective view of a LWD imaging tool with electrically isolated electrodes in an example sensing surface configuration.

In alternative embodiments, the elongated sensing surfaces can be implemented by having separate electrodes arranged, for example, in a similar configuration as that previously shown, but isolated from and surrounded by metal with an active control to maintain the same potential as the electrodes to help focus the currents deeper into the formation. In an example configuration, FIG. 6 shows a perspective view of one portion of another exemplary borehole imaging tool 600. In this example, the borehole imaging tool 600 is a drill collar (e.g., a thick-walled steel tubular) having two or more stabilizer fins 602 that maintain the borehole imaging tool 600 near the center of the borehole and, in so doing, minimizes standoff between the external faces of the stabilizer fins 602 and the borehole wall. The borehole imaging tool 600 includes a pad 604 having multiple elongated sensing surfaces 606 embedded in the external, wall-contacting face of at least one stabilizer fin 602 of the borehole imaging tool 600. The wall-contacting face may be provided on an extendable sensor pad or embedded on the outer surface of a LWD stabilizer fin. The sensor placement on the external surfaces (e.g., wall-contacting faces) of the stabilizer fin(s) minimizes standoff from the borehole wall and generally yields improved image resolution. Other mechanisms can be employed to minimize standoff, such as pads mounted on extendable arms or biasing springs as shown in FIG. 2. Such arms or springs may be used to force the tool body itself against the borehole wall. The body of the pad 604 is a conductive material, such as steel or another metal, with electrodes provided on the wall-contacting face of the pad 604.

The elongated sensing surfaces 606 are arranged in pairs with a series of rectangular-shaped electrodes that are aligned perpendicularly to each other within each of the pairs (e.g., 308-614). The term "pair" is used to refer to each set of two perpendicularly aligned electrodes having similar dimensions. It is noted that each of the pairs is of a different size relative to the other pairs. For example, the electrodes in each of the pairs 608-614 are smaller in size than the pair preceding it, respectively. The electrodes are electrically isolated from the surrounding metal of the pad 604 using an insulating material that is placed to separate the electrodes. Further, a control is included to maintain the potential difference between the electrodes and the rest of the metal pad 604 to help focus currents deeper into the formation. The current out of the electrodes is measured across a resistor.

In the presence of layered formations with sequences of high and low relative resistivity, the example embodiments described herein of perpendicular current surface measurements increase sensitivity to dip and improve the detection of anisotropy in at least three ways. As previously illustrated in FIG. 4, the resistivity readings of two perpendicularly-oriented (relative to each other) groves are different. Horizontal grooves are able to resolve formation layers, and measures the sequence of high and low resistivity values as the tool travels downhole. Vertical grooves measure the combined resistivity of the layers for which it crosses.

First, the use of multiple pairs of elongated sensing surfaces of varying sizes improves the resolution of anisotropy characterization. With the use of a large electrode to focus currents into the formation, the elongated sensing surfaces can detect formation layers having a width that is at least as wide or wider than the thinnest of the horizontally-aligned elongated sensing surfaces (e.g., the grooves aligned parallel to the formation layers). If formation layers are wider (e.g., thicker) than that of the thinnest groove on the elongated sensing surface, the formation layers can be detected.

The second way in which anisotropy detection can be improved is related to the first one. Differences can be detected in the amount of current injected on the two perpendicular directions of similarly-sized (but rotated/perpendicularly-oriented relative to each other) elongated sensing surfaces on the pad. Because the sensor pad contains perpendicular shapes, when one shape is parallel to the formation layers, the other shape is perpendicular to the layers. That is, when one horizontally-oriented shape measures a resistivity of single layers, the perpendicular equivalent surface (e.g., vertically-oriented shape) measures the combined resistivities of the layers for which it traverses. Because the potential over the entire surface of the pad is approximately constant, the amount of current flowing out of each shape will be different, and that difference is an indicator of the anisotropy. Here it is important that the contact conditions of the two layers be similar otherwise the differences might be explained only by contact conditions. To compensate the possible difference in contact conditions, there could be multiple sensors that could be averages or there could be a measurement of average standoff.

Although the discussions here contemplate a perfect alignment with the formation layers, one of ordinary skill in the art will recognize that the drawings and examples are provided only for exemplary purposes and that formation configurations will vary along the borehole. However, one will also recognize that around the borehole, for any dip angle, there will usually be a condition downhole that approximates the alignments contemplated here (i.e., of a horizontal shape being able to resolve the layers to measure sequences of high and low resistivity values, and the vertical shape measuring the combined resistivity of the layers for which it traverses), because the orientation of the layers with respect to the face of the pad around the borehole changes as shown in FIG. 7 below.

Figure 7A:
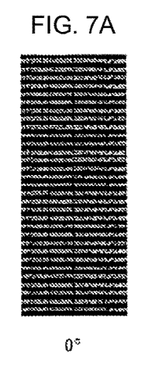
FIGS. 7A-7E show various orientation of formation layers as may be encountered by a tool pad of a wireline or LWD borehole imaging tool.
Figure 7B:
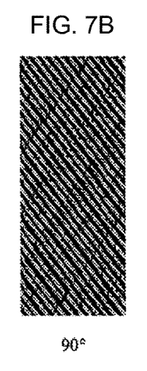
Figure 7C:
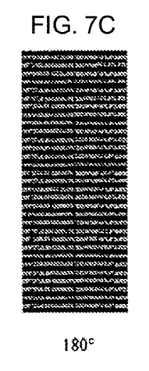
Figure 7D:
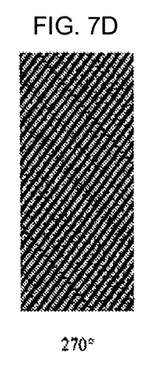
Figure 7E:
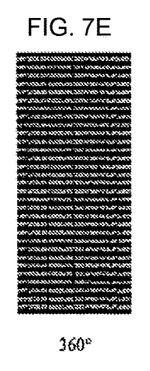

FIGS. 7A-7E illustrate example orientations of downhole formation layers as seen by the sensing surfaces of a tool pad. In particular, FIG. 7A illustrates the angle as being 0° (e.g., relative to a plane that is parallel to the strike direction). FIGS. 7B-7E differ from each other by 90° (e.g., the angles in FIGS. 7B-7E are approximately at 90°, 180°, 270°, and 360° relative to the plane parallel to the strike direction, respectively). One of ordinary skill in the art will recognize that the examples of FIGS. 7A-7E are approximated and that the actual angle of formation layers experienced downhole may vary.

Third, focusing the currents into the formation at different angular positions around the wall of the borehole improves the detection of anisotropy when the plane of the layers forms a dip angle with respect to the borehole. The use of multiple pads, such as on the external faces of LWD stabilizer fins, means that resistivity measurement is taken at different azimuth angles around the borehole. The layered formation angle that the currents (the ones perpendicular to the surface of the metal pad) go across is different depending on the position along the azimuth angle. The dip angle of the layers with respect to the currents perpendicular to the surface of the pad varies as the azimuth angle varies. If the reference of the azimuth angle is the azimuth of the strike direction, the angle of the layers with respect to the surface of the borehole varies from $\theta_{max}$ at 0° to 0 at 90° to $\theta_{max}$ at 180° to 0 at 270° and then back to $\theta_{max}$ at 360° (i.e., it is the opposite of the angles as shown in FIGS. 7A-7E). This means that the focused currents emanating from the surface of the metal will be more strongly affected by dip angle than a typical galvanic tool, which is symmetric in the azimuth angle. In the laterolog, for example, both cases (dip=$\theta_{max}$ and dip=0) are together in parallel, and therefore the sensitivity to dip is not as large. By the pattern that layered anisotropy creates around the borehole wall on the different pads, the characteristic pattern can be used to further identify anisotropy.

Figure 8:
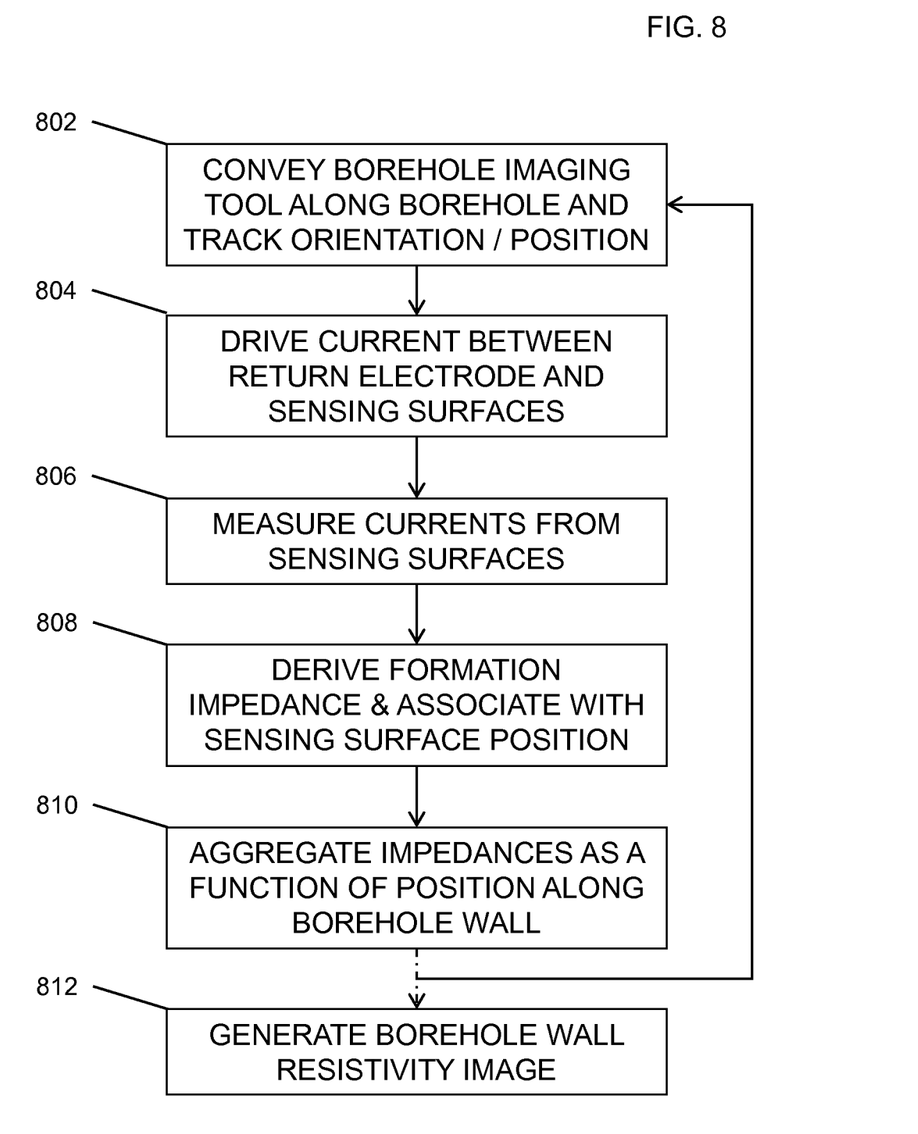
FIG. 8 is a flow diagram of an illustrative borehole imaging method.

FIG. 8 shows a flow diagram of an illustrative resistivity imaging method. In operation 802, a borehole imaging tool is conveyed along a borehole while its position and orientation are tracked. For LWD, the borehole imaging tool is part of the bottom hole assembly (BHA) and is used to perform logging while drilling. For wireline logging, the tool is part of a sonde that is lowered to the bottom of the region of interest and the elongated sensing surfaces are deployed to contact the wall and perform logging as the logging tool is pulled uphole at a steady rate.

To perform logging, an electrical current or voltage signal is applied between a return electrode and elongated sensing surfaces in operation 804. In operation 806 the currents from each elongated sensing surface are measured. Based on the ratio between the applied signal and the measured currents, the system derives a formation impedance estimate in operation 808 and associates the estimate with a position on the borehole wall in front of the associated elongated sensing surface. (Typically, a calibration factor will be employed in the derivation of a formation impedance estimate from the ratio. The calibration factors are determined during a tool calibration process before the tool is deployed. It can also be evaluated by numerical modeling) In operation 810, the system aggregates the estimates associated with each position on the borehole wall to form a borehole wall image. A pattern that layered anisotropy creates around the borehole wall on the elongated sensing surface of different pads can be used to identify anisotropy. Operations 802-810 are repeated until the region of interest has been logged. During or after the logging process, the system generates a visual representation of the borehole wall image in block 912. A user may rely on the image to control drilling direction or to make decisions regarding completion and production from the well.

The elongated sensing surface configurations of the borehole imaging tool described herein can be added to standard pad tools, as their implementation does not require a large surface area. The elongated sensing surface configurations are easy to implement and may be used to create imaging tools that combine both standard imaging tool hardware and the new configuration in a single pad. The additional information from the borehole imaging tool is useful to derive additional information about anisotropy, beyond the standard information gatherable by current imaging tools. The improved detection of anisotropy in thin layered formations and the improved sensitivity to dipping in anisotropic formations allows enhanced assessment of anisotropy in layered formations.

The above-described borehole imaging tool embodiments can function in both oil-based and water-based borehole fluids, though it is expected that tools designed for use in oil-based fluids will generally speaking employ larger sensing surfaces and higher signal frequencies than tools designed from use in water-based borehole fluids. LWD tools may generally employ larger sensing surfaces than wireline logging tools to provide better standoff tolerance.

In one embodiment, the present disclosure may be embodied as a set of instructions on a computer readable medium comprising ROM, RAM, CD, DVD, hard drive, flash memory device, or any other computer readable medium, now known or unknown, that when executed causes a processing unit, such as a tablet computer 132 of FIG. 1, to implement a method of the present disclosure, for example the method described in FIG. 8.

Though described serially in the examples of FIG. 8, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

In no way should the embodiments described herein be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells as well as production wells, including natural resource production wells such as hydrogen sulfide, hydrocarbons or geothermal wells. Devices and methods in accordance with embodiments described herein may be used in one or more of wireline, slickline, MWD and LWD operations. Embodiments described below with respect to one implementation, such as wireline, are not intended to be limiting. Embodiments may be implemented in various formation tester tools suitable for testing, retrieval and sampling along sections of the formation that, for example, may be conveyed through flow passage in tubular string or using a wireline, slickline, tractor, piston, piston-tractor, coiled tubing, downhole robot or the like.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A borehole imaging tool for use in a borehole that penetrates a subsurface formation, the borehole imaging tool comprising:
   a return electrode; and
   a conductive body having a wall contacting face with a first and a second elongated sensing surface, wherein the first and the second elongated sensing surfaces are arranged perpendicular to each other corresponding to different resistivity readings based on an electrical current or voltage signal applied between the elongated sensing surfaces and the return electrode.

2. The tool of claim 1, wherein the first and the second elongated sensing surfaces are each defined by one or more grooves in the wall contacting face, wherein each of the first and second elongated sensing surfaces has a corresponding toroid seated in the one or more grooves defining that elongated sensing surface.

3. The tool of claim 2, further comprising a processing unit configured to obtain measurements of each toroid's response when a voltage signal or current is applied between the conductive body and the return electrode, wherein the processing unit is further configured to derive a formation impedance measurement for each elongated sensing surface based at least in part on the toroid responses.

4. The tool of claim 2, wherein the one or more grooves are linear, and further wherein the one or more grooves are arranged into a plurality of pairs of grooves in the wall contacting face.

5. The tool of claim 4, wherein each of the plurality of pairs of grooves has a different size than the other plurality of pairs of grooves.

6. The tool of claim 2, wherein each of the one or more grooves has a different size than the other of the one or more grooves.

7. The tool of claim 3, further comprising:
   a surface processor coupled to either the processing unit or a memory disposed in the borehole imaging tool.

8. The tool of claim 1, wherein the wall contacting face of the conductive body includes a first and a second circular surface, wherein the first elongated sensing surface is one of a first plurality of elongated sensing surfaces positioned within the first circular surface, and further wherein the second elongated sensing surface is one of a second plurality of elongated sensing surfaces arranged perpendicular to the first plurality of elongated sensing surfaces and positioned within the second circular surface.

9. The tool of claim 1, wherein the first and second elongated sensing surfaces represent a subset of a plurality of elongated sensing surfaces included on the wall contacting face.

10. The tool of claim 9, wherein at least one of the plurality of elongated sensing surfaces has a different size or shape than another one of the plurality of elongated sensing surfaces.

11. The tool of claim 1, wherein the conductive body is electrically insulated from a main body of the borehole imaging tool.

12. The tool of claim 1, wherein the conductive body is included on a wireline tool pad.

13. The tool of claim 1, wherein the conductive body is included in a logging-while-drilling tool.

14. A resistivity imaging method comprising:
   driving a current or voltage between a return electrode and a conductive body having a wall contacting face with a plurality of elongated sensing surfaces, wherein each of the plurality of elongated sensing surfaces is defined by one or more grooves in the wall contacting face that are arranged perpendicular to each other, and further wherein each of the plurality of elongated sensing surfaces has a corresponding toroid seated in the one or more grooves defining that elongated sensing surface;
   measuring a response of each toroid to the current or voltage;
   deriving a formation impedance measurement for each elongated sensing surface based at least in part on the measured responses; and
   associating the formation impedance measurements with positions of the elongated sensing surfaces.

15. The method of claim 14, further comprising:
   aggregating the formation impedance measurements as a function of position to obtain a resistivity image of a borehole wall.

16. The method of claim 14, wherein the one or more grooves are linear, and further wherein the one or more grooves are arranged into a plurality of pairs of grooves in the wall contacting face.

17. The method of claim 16, wherein each of the plurality of pairs of grooves has a different size than the other plurality of pairs of grooves.

18. The method of claim 14, wherein at least one of the plurality of elongated sensing surfaces has a different size or shape than another one of the plurality of elongated sensing surfaces.

19. A borehole imaging system, comprising:
   a borehole imaging tool that travels along a borehole that penetrates a subsurface formation, the borehole imaging tool including:
      a conductive body having a wall contacting face with a plurality of elongated sensing surfaces, wherein each of the plurality of elongated sensing surface is defined by one or more grooves in the wall contacting face that are arranged perpendicular to each other, and further wherein each of the plurality of elongated sensing surfaces has a corresponding toroid seated in the one or more grooves defining that elongated sensing surface; and
      a tracking unit that track a position and orientation of the wall contacting face; and
   a processing unit coupled to the borehole imaging tool via a telemetry system to obtain the position and orientation and corresponding formation impedance measurements for each of the plurality of elongated sensing surfaces, wherein the processing unit determines a borehole wall resistivity image.

20. The system of claim 19, wherein the processing unit determines each pixel of the borehole wall resistivity image by combining multiple formation impedance measurements associated with a corresponding position on the borehole wall.

21. The system of claim 19, wherein the one or more grooves are linear, and further wherein the one or more grooves are arranged into a plurality of pairs of grooves in the wall contacting face.

22. The system of claim 21, wherein each of the plurality of pairs of grooves has a different size than the other plurality of pairs of grooves.

\* \* \* \* \*